(12) United States Patent
Barenett

(10) Patent No.: US 6,536,712 B1
(45) Date of Patent: Mar. 25, 2003

(54) INFLATABLE SATELLITE

(75) Inventor: David M. Barenett, Littleton, CO (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/610,349

(22) Filed: Jul. 5, 2000

Related U.S. Application Data
(60) Provisional application No. 60/145,166, filed on Jul. 22, 1999.

(51) Int. Cl.⁷ ................................................. B64G 1/10
(52) U.S. Cl. ..................... 244/158 R; 244/159; 244/160
(58) Field of Search ............................... 44/158 R, 159, 44/160

(56) References Cited

U.S. PATENT DOCUMENTS

| | | | | |
|---|---|---|---|---|
| 3,169,725 A | * | 2/1965 | Berglund | 244/155 R |
| 3,348,352 A | * | 10/1967 | Cummings | 244/1 R |
| 4,113,206 A | * | 9/1978 | Wheeler | 244/125 |
| 4,395,004 A | * | 7/1983 | Ganssle et al. | 244/158 R |
| 4,575,029 A | * | 3/1986 | Hartwood et al. | 244/172 |
| 4,633,566 A | * | 1/1987 | Coppa | 244/158 R |
| 4,715,566 A | * | 12/1987 | Nobles | 244/159 |
| 4,872,625 A | * | 10/1989 | Filley | 244/159 |
| 5,044,579 A | * | 9/1991 | Bernasconi et al. | 244/158 R |
| 5,052,640 A | * | 10/1991 | Chang | 136/292 |
| 5,086,999 A | * | 2/1992 | Mullen | 244/159 |
| 5,386,953 A | * | 2/1995 | Stuart | 244/158 R |
| 5,743,786 A | * | 4/1998 | Lindsey | 446/221 |
| 5,803,402 A | * | 9/1998 | Krumweide | 224/158 R |
| 6,076,770 A | * | 6/2000 | Nygren et al. | 244/158 R |
| 6,206,328 B1 | * | 3/2001 | Taylor | 244/158 R |
| 6,231,010 B1 | * | 5/2001 | Schneider et al. | 244/159 |
| 6,293,500 B1 | * | 9/2001 | Bigelow | 244/158 R |
| 6,318,674 B1 | * | 11/2001 | Simburger | 244/158 R |

* cited by examiner

Primary Examiner—Charles T. Jordan
Assistant Examiner—Stephen Holzen
(74) Attorney, Agent, or Firm—Swidler Berlin Shereff Friedman, LLP

(57) ABSTRACT

The invention is a satellite assembly comprising at least three flat housings in a plane for containing the payload of the satellite, each housing having at least two inflatable tubular members coupled by a first end thereto and by their second ends to separate adjacent housings. The individual housings have protrusions about their respective peripheries for attaching the tubular members at least equal to the number of the tubular members coupled thereto.

23 Claims, 3 Drawing Sheets

INFLATABLE SATELLITE

REFERENCE TO RELATED APPLICATIONS

This application is a continuation-in-part of Provisional Patent Application Serial No. 60/145,166 "Nano Satellite Formation Flying System", filed Jul. 22, 1999.

BACKGROUND OF THE INVENTION

1. Field of the Invention

The invention relates to the field of satellites and, in particular, to inflatable satellites.

2. Description of Related Art

Inflatable satellites are old in the art. For example, the ECHO satellite launched in the early dates of space flight was a large balloon with a reflective coating. Of course, later designs such as disclosed in U.S. Pat. No. 5,386,953, entitled "Spacecraft Designs For Satellite Communication System," by J. R. Stuart were a far more sophisticated communications satellite design including an inflatable torus shaped structure incorporating an array of antennas and solar cells. However, this design does not store in a very small volume, nor is it light in weight. In addition, continued pressurization is required to insure that its shape is maintained. Thus a large supply of pressurized gas is required in order to maintain internal pressurization over a long time period. The patent to J. R. Stuart also discloses a hemispherical shaped satellite design using a tubular truss assembly to support a series of antennas that allows stacking of a series thereof. While this design allows for storing a significant number of satellites in a relatively small volume, the satellite is not designed to be collapsed into a very small volume. Therefore there is the need for a low cost and small size satellite that can be used for missions requiring small payloads and which can easily be scaled up to handle larger payloads.

Thus, it is a primary object of the invention to provide an inflatable satellite design.

It is another primary object of the invention to provide an inflatable satellite design that stores in a very small volume when un-inflated.

It is a further object of the invention to provide an inflatable satellite design that once inflated remains rigidized upon elimination of internal pressurization.

It is a still further object of the invention to provide an inflatable satellite design that can be easily scaled up in size.

SUMMARY OF THE INVENTION

The invention is a satellite assembly comprising at least three flat housings in a plane for containing the payload of the satellite, each housing having at least two inflatable tubular members coupled by a first end thereto and by their second ends to separate adjacent housings. The individual housings have protrusions about their respective peripheries for attaching the tubular members at least equal to the number of the tubular members coupled thereto.

For standardization purposes, the housings have six equally spaced protrusions extending from the periphery thereof. At least one of the housing includes a mechanism for internally pressurizing said tubular members such that they become inflated and rigid.

The assembly further includes a system for insuring that the tubular members remain in the inflated condition without internal pressurization. This system preferably comprises a fibrous inner layer of material impregnated with an ultraviolet radiation curing resin. Thus when the satellite assembly is placed in orbit, ultraviolet radiation from the sun will cure the resin and simultaneously bond the fibrous layer to the outer layer, thereby rigidizing the tubular member. The preferred configuration of the satellite assembly comprises 10 housings in a triangular pattern.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

DESCRIPTION OF THE PREFERRED EMBODIMENT

Figures 1, 3:
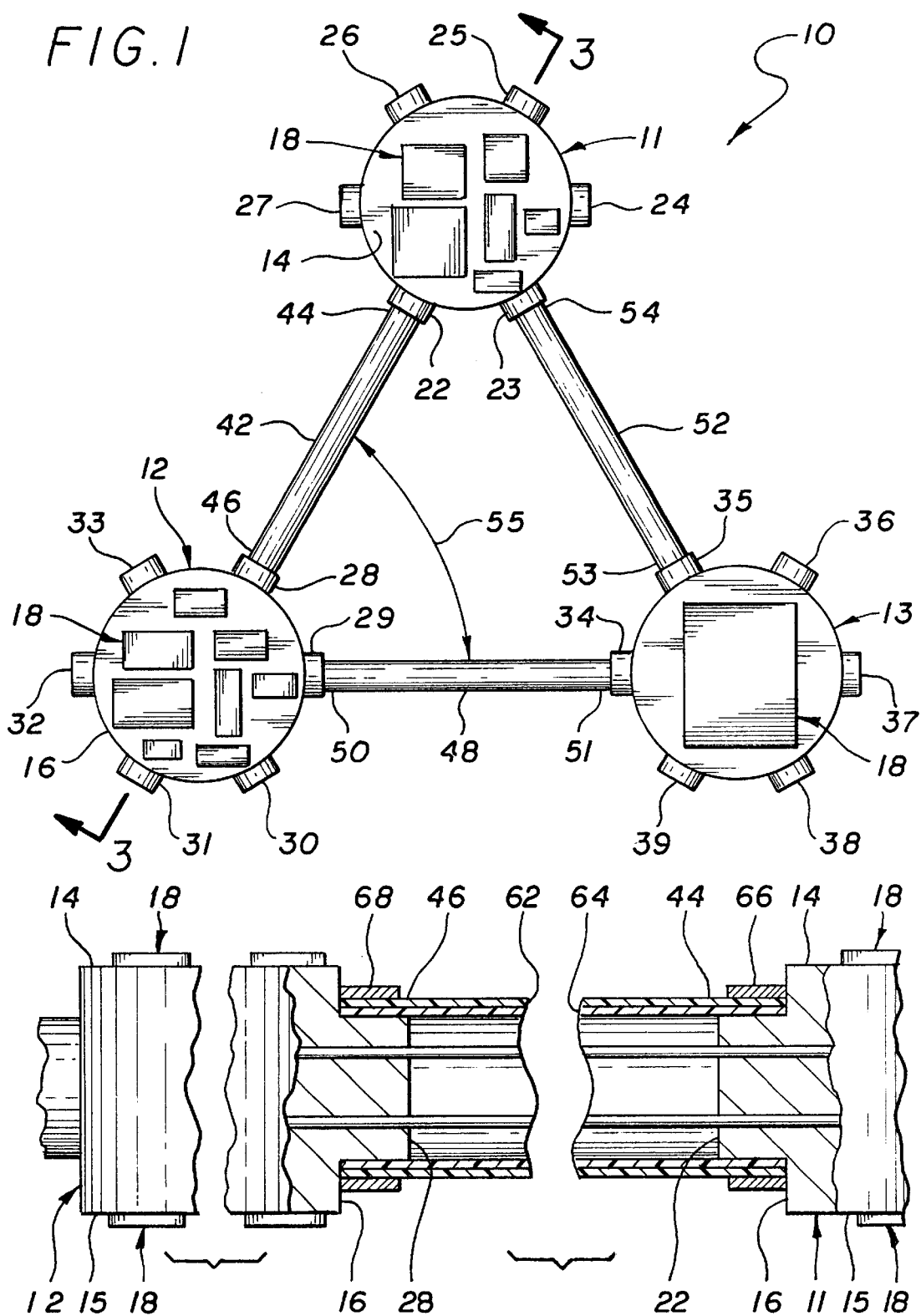
FIG. 1 is a top view of a first embodiment of the satellite assembly having three housings.
FIG. 3 is partial cross-sectional view of FIG. 1 illustrating the construction of the tubular member connecting two of the housings.

Referring to FIG. 1, the satellite, generally indicated by numeral 10 includes three identical circular housings 11, 12 and 13 all having top surfaces 14, bottom surfaces 15 and peripheral side surfaces 16. The housings 11, 12, and 13 contain the satellite payload 18 and other equipment necessary for operating the satellite, which may vary from housing to housing.

1. The housing 11 includes six tubular mounting members 22, 23, 24, 25, 26 and 27.
2. The housing 12 includes six tubular fittings 28, 29, 30, 31, 32, and 33.
3. The housing 13 includes six tubular fittings 34, 35, 36, 37, 38 and 39.

All the tubular fittings extend from the peripheral side surface 16 of each housing 11, 12, and 13 equally spaced at 60 degrees from each other. Although, in this application, there could be as few as two at 60 degrees apart. However, because of the building block approach of this satellite design, six equally spaced tubular mounting members are preferred. A tube 42 is mounted by a first end 44 to a member 22 of housing 11 and by a second end 46 to member 28 of housing 12. A second tube 48 is mounted by a first end 50 to fitting 29 on the housing 12 and by a second end 51 to housing 13. Finally, a third tube member 52 is mounted by a first end 53 to fitting 35 of housing 13 and by a second end 54 to fitting 23 of housing 11. Thus a triangular shaped satellite assembly is formed having an included angle 55 of 60 degrees between the housings.

The tubes 42, 48 and 52 are all identical and thus only tube 42 will be discussed in detail. Preferably, the tube 42, is made of an outer layer 62 of a material such as a polyimide, for example Kapton® manufactured by E. I.

duPont de Nemours & Company, Williamsburg, Del. Such materials can serve as a pressure barrier. The inner layer 64 is made of a fiber-reinforced layer impregnated with an ultraviolet radiation curable resin. The inner layer 64 can be made of such materials as a liquid crystal thermotropic (melt spun) polyester polyarylate fiber, for example VECTRAN® manufactured by Hoechat Celanese, Charlotte, N.C. or SPECTRA® manufactured by Allied Signal, Petersberg, Va. to carry the axial loads. Another high strength material is a lyotropic (solvent spun) aromatic polyaramide fiber, such as KEVLAR®, which is manufactured by E. I. duPont de Nemours & Company. There is any number of usable ultra-violet radiation curable resins, for example, U.S. Pat. No. 4,999,136 "Ultra Violet Curable Conductive Resin" by W. A. Su; et al discloses a suitable resin.

The first end 44 of the tube 42 is bonded to the member 22 of the housing 11 and is additionally secured by a clamp 66, while the second end 46 is bonded to tubular member 28 on housing 12 and additionally secured with a clamp 68. Bonding can be accomplished by exposing the ends 44 and 46 of tube 42 only to ultra-violet radiation. This easily accomplished by masking off all of the tube 42 excepting the ends, prior to exposure to the radiation. Tubes 48 and 52 are joined to housings 11, 12 and 13 in a similar manner.

Figure 2:
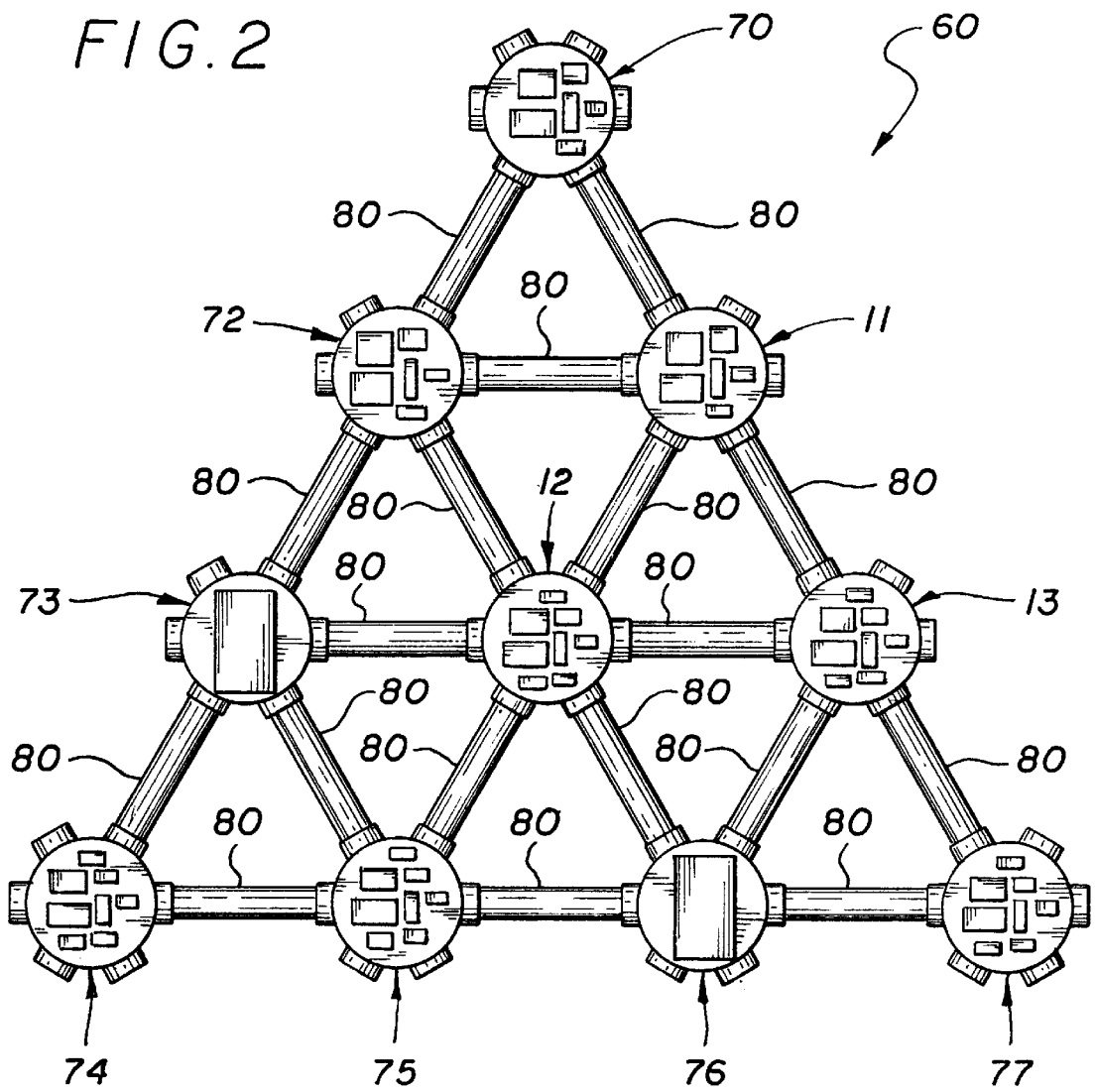
FIG. 2 is a top view of a second embodiment of the satellite assembly having ten housings

In FIG. 2 is a ten housing satellite assembly, generally designated by numeral 60, built upon the satellite assembly shown in FIG. 1. Additional tubular members 80 creating a larger satellite assembly join additional housings 70, 72, 73, 74, 75, 76, and 77. In fact, and combination of housings can be used as long as there are at least three housings and each housing in joined by at least two tubular members to other housings.

Figure 4:
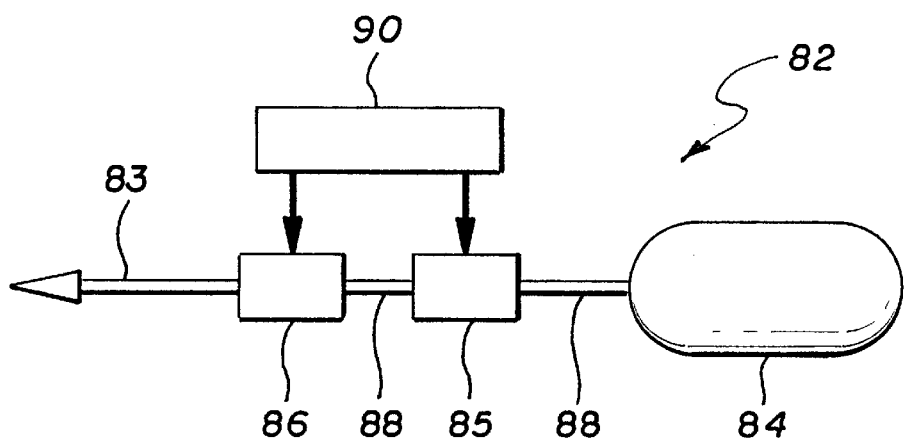
FIG. 4 is a schematic of a pressurization system for inflating the satellite from the stored position to the deployed position.

Still referring to FIGS. 2 and 3 and additionally to FIG. 4 the satellite further includes a gas system 82 mounted in one or more of the housings and connected to the tubular members by lines 83 (see FIG. 4) comprising a pressurized gas source 84 coupled to a control valve 85 and regular 86 via line 88. An electronic controller 90 controls the system 82. Thus upon opening of the valve 85, the tubes 42, 48, and 52 are pressurized and expand and become rigid. Once in space, the resin impregnating the inner layer 64 becomes cured by exposure to ultra-violet radiation from the sun and rigidizes the tubes.

Figure 5:
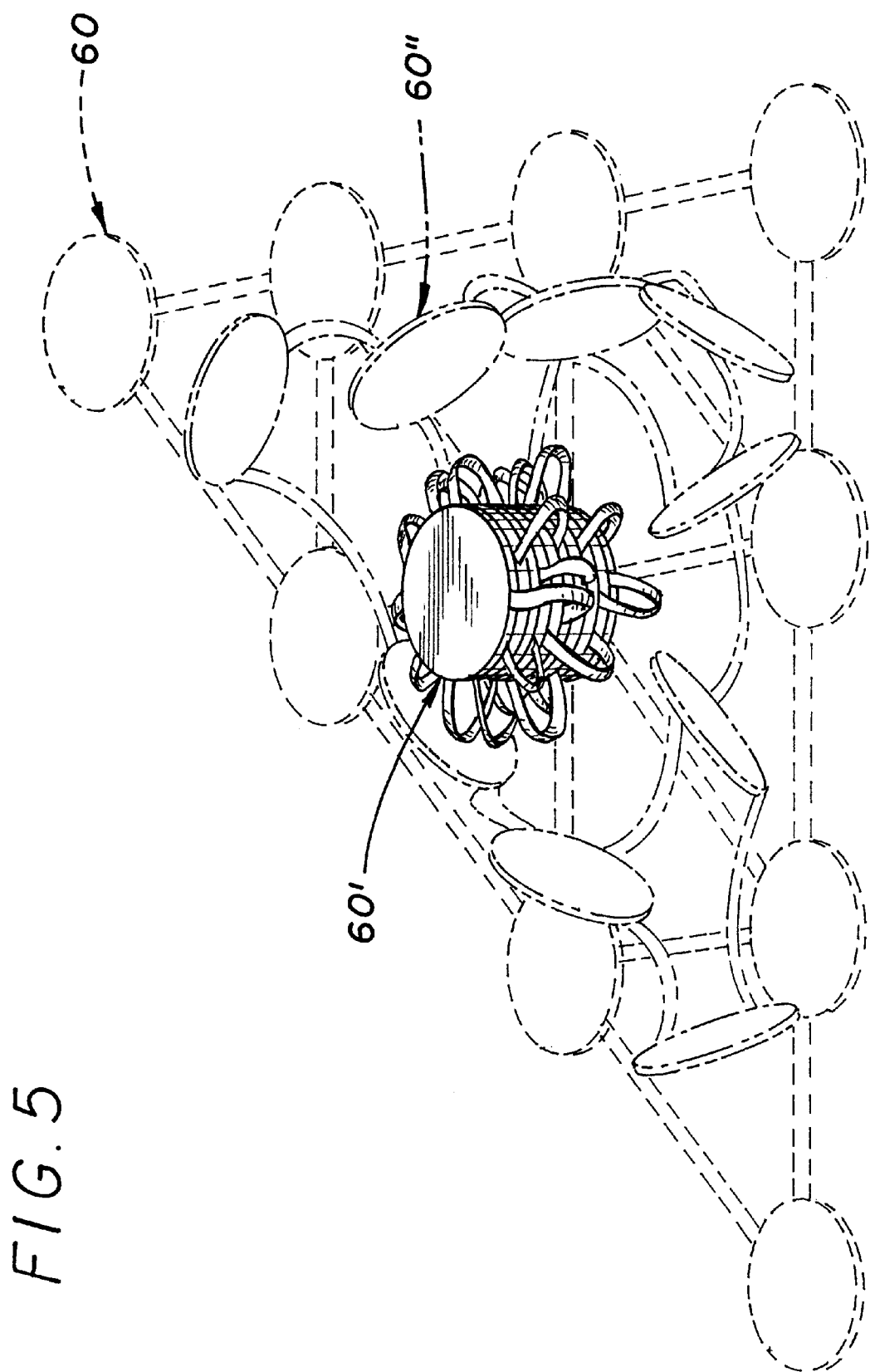
FIG. 5 is a view of satellite shown in FIG. 2 in the stored condition and in the intermediate steps to the deployed position.

Sill referring to FIGS. 2–4 and additionally to FIG. 5, the satellite 60 is stored in the stored position, indicated by numeral 60' during launch and release into orbit. Upon reaching orbit in space, the stored gas system 82 is activated causing the tubes 42, 48, 52 and 80 to expand and become rigid, and opened to an intermediate position 60" and finally to the fully open position 60. After that, ultraviolet radiation from the sun will cause curing resin in the inner layer 64 of the tubes causing the tubes to become permanently rigid. Thus if gas pressure is lost over time, the tubes will still remain ridged. It should be noted that solid state gas generation systems can be also be used. In addition, mechanical rigidizing systems are useable.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

Industrial Applicability

The invention has applicability to the satellite manufacturing industry.

What is claimed is:

1. A satellite assembly, comprising:
    at least three coplanar housings containing a payload;
    a plurality of protrusions extending from each a periphery of each housing; and a plurality of inflatable tubular members each having a first end and a second end and being coplanar with the housing, the first end of each inflatable member being operably connected to one of the protrusions on one of the housings and the second end of each inflatable member being operably connected to one of the protrusions on another of the housings,
    wherein the ends of said inflatable members are clamped in a sealed relationship to said protrusions.
2. The satellite assembly according to claim 1, wherein the housings are flat.
3. The satellite assembly according to claim 1, further comprising:
    an internal pressurizer operable to expand and make rigid the tubular members.
4. The satellite assembly according to claim 3, wherein the satellite comprises ten coplanar housings arranged in a triangular pattern.
5. The satellite assembly according to claim 4, further comprising:
    a rigidizer operable to rigidize the tubular members such without internal pressurization the tubular members remain in a configuration as when inflated.
6. The satellite assembly according to claim 5, wherein the satellite comprises ten coplanar housings arranged in a triangular pattern.
7. The satellite assembly according to claim 5, wherein the rigidizer comprises ultraviolet curable resin arranged on an interior surface of the tubular members.
8. The satellite assembly according to claim 7, wherein the resin is cured by solar ultraviolet radiation when the satellite is in orbit.
9. The satellite assembly according to claim 7, wherein the satellite comprises ten coplanar housings arranged in a triangular pattern.
10. The satellite assembly according to claim 3, wherein the internal pressurizer comprises a gas source.
11. The satellite assembly according to claims 10, wherein the internal pressurizer further comprises a controller, a control valve and a regulator.
12. The satellite assembly according to claim 1, wherein the satellite assembly comprises ten coplanar housings arranged in a triangular pattern.
13. The satellite assembly according to claim 1, wherein each housing comprises five protrusions.
14. The satellite assembly according to claim 13, wherein the protrusions are equally spaced about each housing.
15. The satellite assembly according to claim 1, wherein the protrusions are equally spaced about each housing.
16. The satellite assembly according to claim 1, wherein each housing comprises a similar number of protrusions.
17. The satellite assembly according to claim 1, wherein the housings are not coplanar when in a stowed position.
18. The satellite assembly according to claim 1, wherein the housings are arranged in a stack when in a stowed position.
19. The satellite assembly according to claim 1, wherein not all of the protrusions are operably connected to one of the inflatable members.
20. The satellite assembly according to claim 1, wherein the number of protrusions on each housing is equal to a number of tubular members attached to each housing.

21. A satellite assembly, comprising:

at least three housing containing a payload; and a plurality of inflatable tubular members each having a first end and a second end and coplanar with the housings, the first end of each inflatable member being operably connected to one of the housings and the second end of each inflatable member being operably connected to another of the housings, a plurality of protrusions extending from each a periphery of each housing, the protrusions being operable to couple the housings and the tubular members, wherein the ends of said inflatable members are clamped in a sealed relationship to said protrusions.

22. The satellite assembly accordings to claim 21, wherein the housings are flat.

23. The satellite assembly according to claim 21, wherein a number of protrusions extending from each housing is equal to a number of tubular members coupled to each housing.

* * * * *

UNITED STATES PATENT AND TRADEMARK OFFICE
CERTIFICATE OF CORRECTION

PATENT NO. : 6,536,712 B1
DATED : March 25, 2003
INVENTOR(S) : David M. Barnett

It is certified that error appears in the above-identified patent and that said Letters Patent is hereby corrected as shown below:

Titile page,
Item [75], Inventors, "David M. Barenett" should read -- David M. Barnett --.
Item [56], References Cited, U.S. PATENT DOCUMENTS,
"4,575,029 A * 3/1986 Hartwood et al." should read
-- 4,575,029 A * 3/1986 Harwood et al. --.

Column 4,
Line 43, "claims 10," should read -- claim 10, --.

Signed and Sealed this

Twenty-eighth Day of September, 2004

JON W. DUDAS
*Director of the United States Patent and Trademark Office*